(12) United States Patent
Studer et al.

(10) Patent No.: US 8,683,737 B2
(45) Date of Patent: Apr. 1, 2014

(54) ANIMAL TRAP

(75) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 183 days.

(21) Appl. No.: 12/946,100

(22) Filed: Nov. 15, 2010

(65) Prior Publication Data

US 2012/0117853 A1   May 17, 2012

(51) Int. Cl.
*A01M 23/08* (2006.01)
*A01M 23/18* (2006.01)

(52) U.S. Cl.
USPC .......................... 43/61; 43/67; 43/73; 43/58

(58) Field of Classification Search
USPC .............. 43/58, 60, 61, 64, 65, 66, 67, 73, 74
IPC ........... A01M 23/00, 23/02, 23/08, 23/14, 23/18
See application file for complete search history.

(56) References Cited

U.S. PATENT DOCUMENTS

| 1,347,255 | A | * | 7/1920 | Davenport | 43/84 |
| 2,170,000 | A | | 8/1939 | Eggleston | |
| 3,778,923 | A | * | 12/1973 | Cuoco | 43/69 |
| 4,103,448 | A | | 8/1978 | Souza | |
| 4,393,616 | A | | 7/1983 | Kaufman et al. | |
| 4,829,701 | A | * | 5/1989 | ImBrogno | 43/61 |
| 4,979,327 | A | * | 12/1990 | Harris | 43/61 |
| 5,267,411 | A | * | 12/1993 | Phillips et al. | 43/81 |
| 6,622,422 | B2 | * | 9/2003 | Gehret et al. | 43/61 |
| 2003/0110679 | A1 | * | 6/2003 | Collins | 43/81 |
| 2004/0025410 | A1 | * | 2/2004 | Shapland | 43/65 |
| 2011/0072709 | A1 | * | 3/2011 | Patterson et al. | 43/81 |
| 2011/0138676 | A1 | * | 6/2011 | Moustirats | 43/61 |

* cited by examiner

*Primary Examiner* — Darren W Ark
*Assistant Examiner* — Lisa Tsang
(74) *Attorney, Agent, or Firm* — Thomas J. Nikolai; Nikolai & Mersereau, P.A.

(57) ABSTRACT

A humane repeating animal trap having multiple points of entry hiding the contents of the trap from view while permitting selective viewing of the contents without opening the trap and indicators signaling not only the presence of animals within the trap, but also which of multiple points of entry were used by the animals to enter the trap.

4 Claims, 5 Drawing Sheets

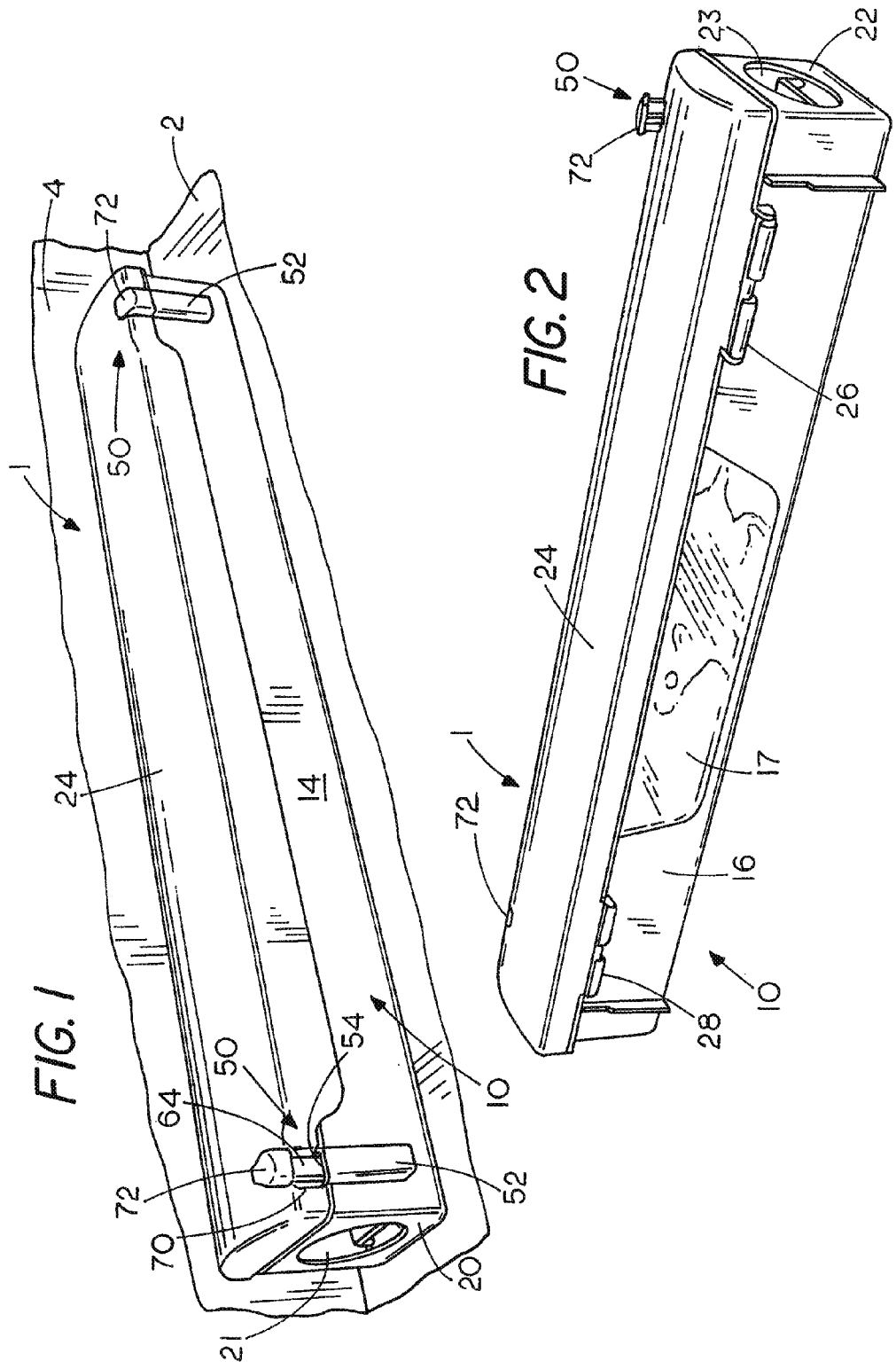

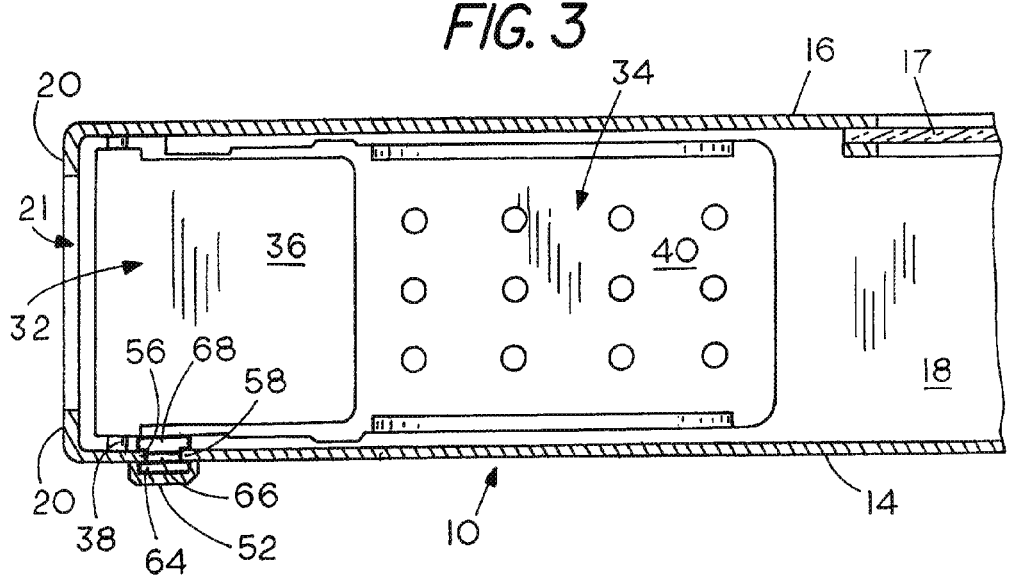
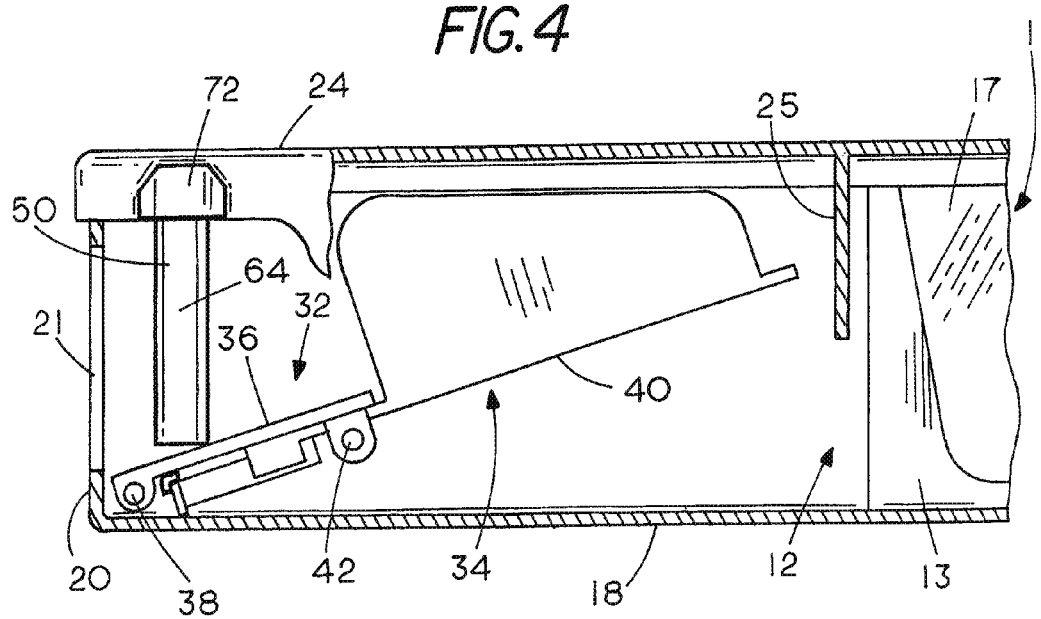

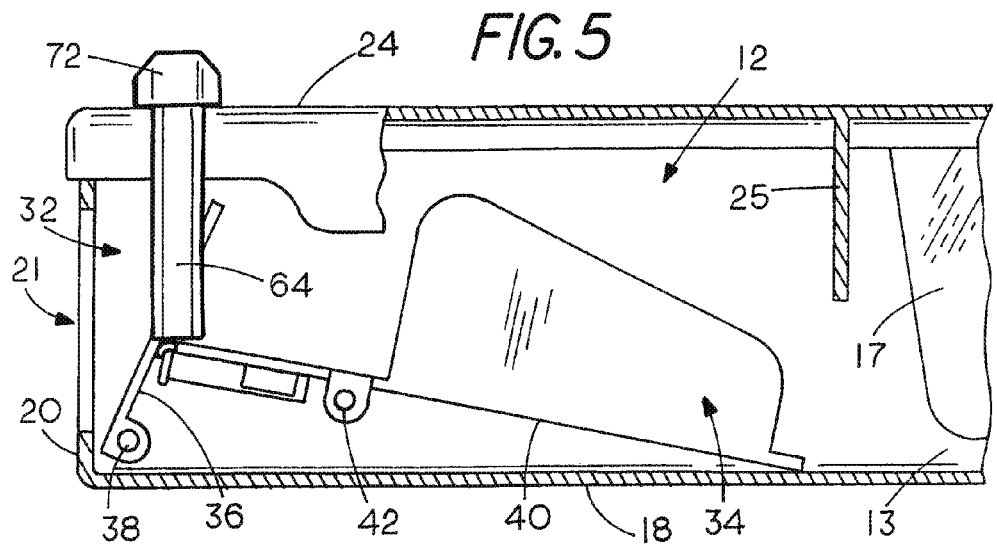
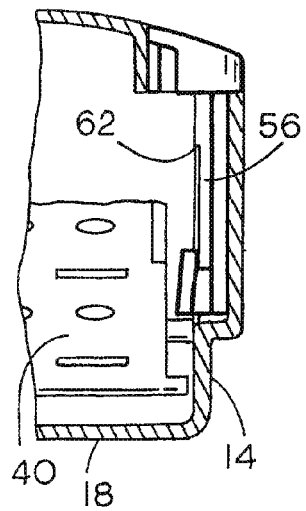
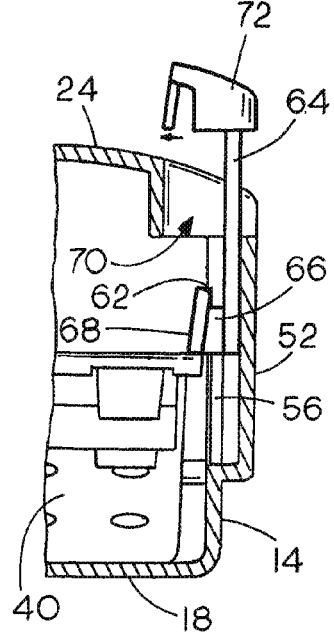
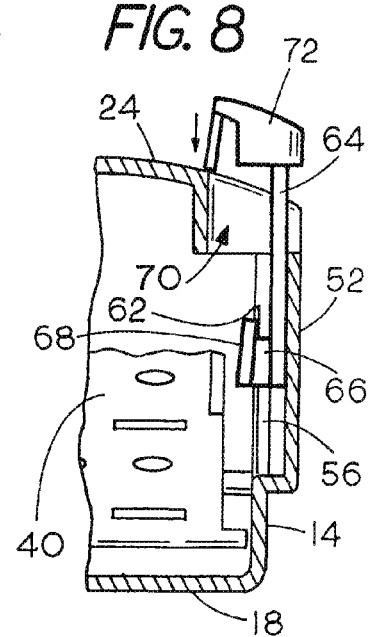

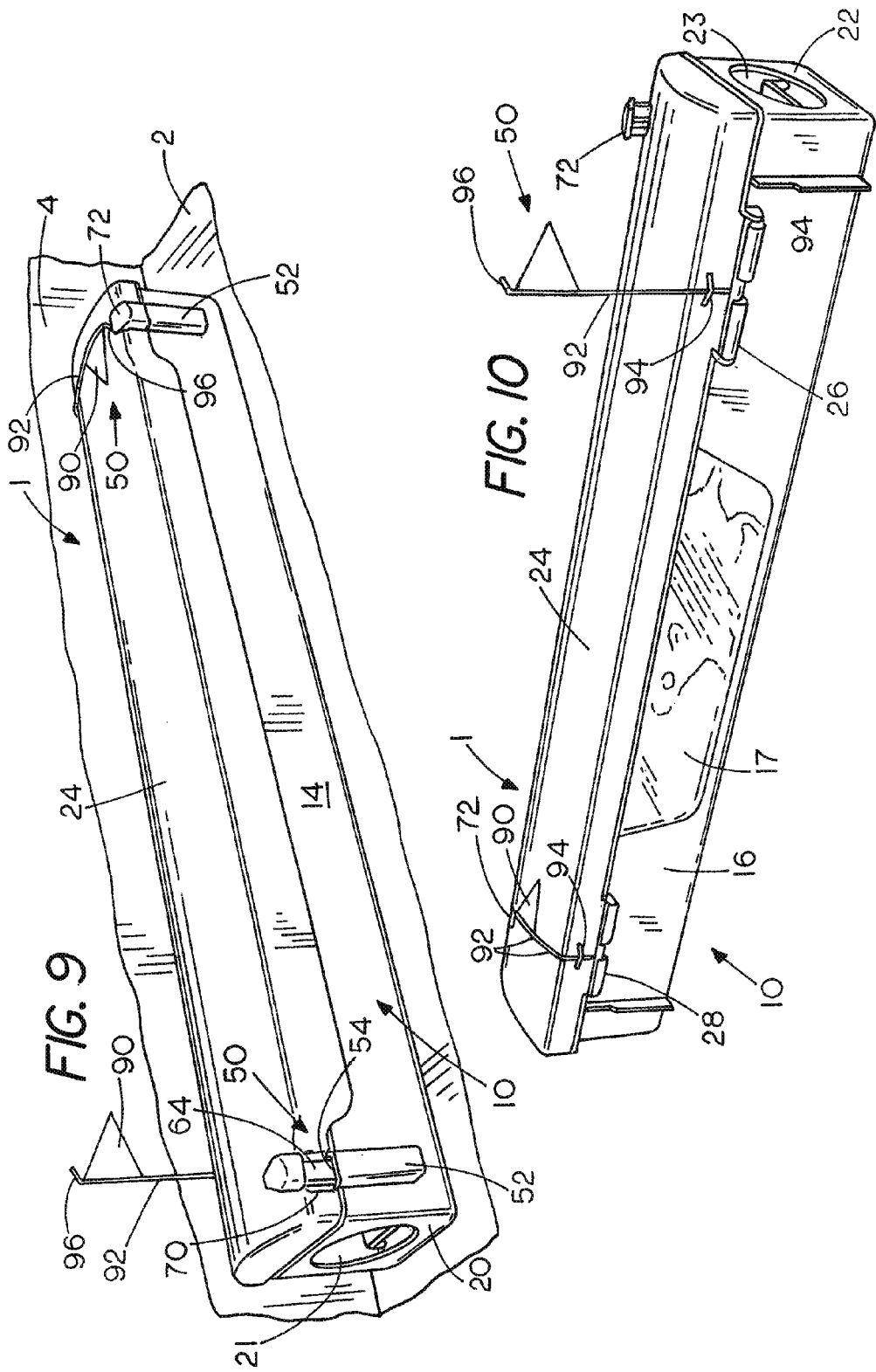

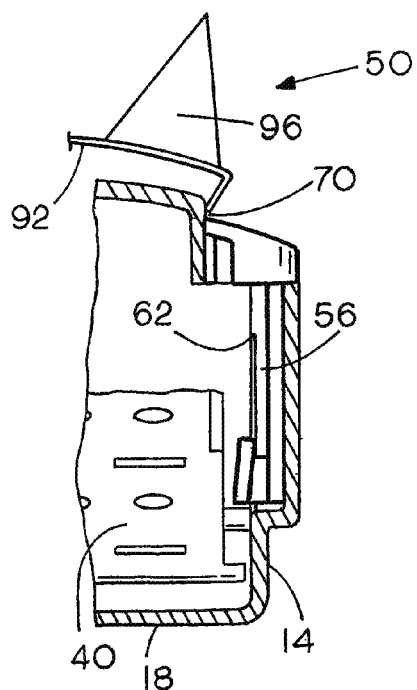
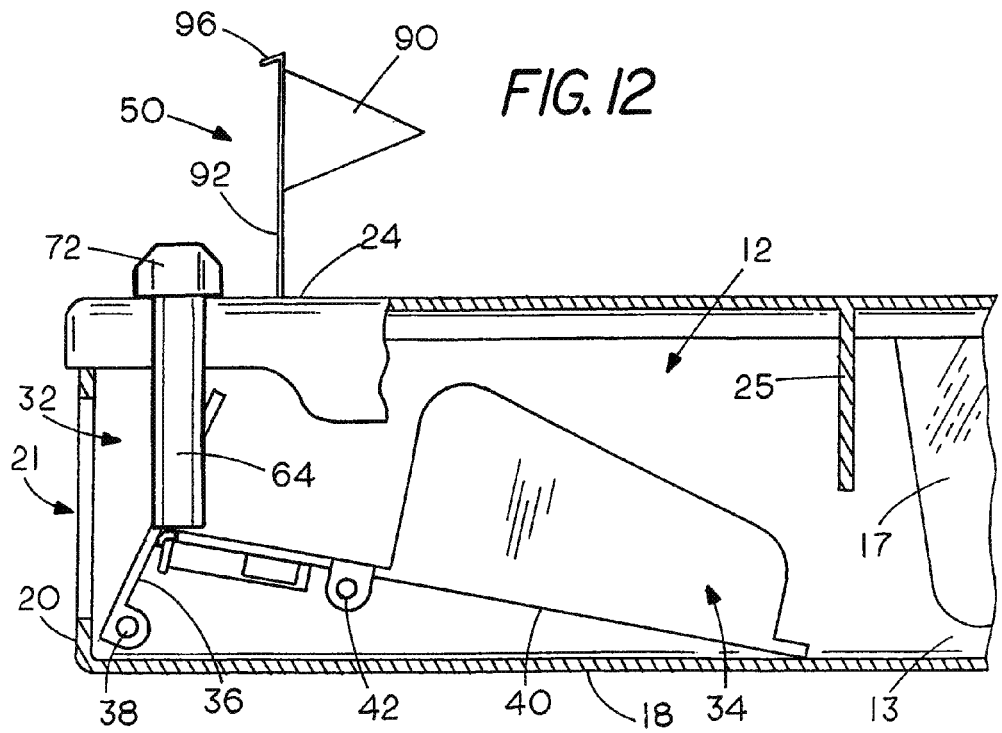

ANIMAL TRAP

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to traps for capturing small animals such as rats, mice and other rodents. The invention provides a mechanism for trapping the animals alive and without injury, and for transporting animals once they have been trapped. The invention hides the trapped animals from view yet provides an indication of whether an animal has been trapped.

II. Related Art

Numerous traps have been provided over the years. A number of these, including those shown in U.S. Pat. No. 4,103,448 to Anthony J. Souza and U.S. Pat. No. 4,393,616 to Gilbert T. Kaufman et al are designed to humanely trap the animals. The Souza trap is a repeating trap. In other words, a plurality of animals can be trapped without resetting the trap. However, the Souza trap does not include an indicator signaling whether the trap has captured an animal. While Kaufman et al includes an indicator signaling the presence of an animal in the trap, it is not a repeating trap. Once a first animal has been captured, no second animal can be captured until the first animal is removed and the Kaufman trap is reset.

SUMMARY OF THE INVENTION

The present invention provides a repeating trap which is easy to operate and maintain. The trap obstructs viewing of animals within the trap. This is advantageous since many people are repulsed by the sight of rats, mice and other rodents. The trap includes more than one ingress opening for the animals and an indicator associated with each ingress opening. These indicators signal whether an animal is in the trap. These indicators likewise signal which ingress opening was used by an animal to enter the trap thus providing information about the direction from which the animal traveled to reach the trap. To assist in determining the number of animals within the trap, a window can be provided in the back or bottom of the trap. This window can be placed against the wall or floor of a building or other surface to block the window from view when the window is not being used to inspect the contents of the trap. Alternatively, an opaque removable covering can be provided over the window.

The animal trap of the present invention comprises an elongate base having an open top chamber defined by a front wall, a rear wall, a bottom wall, a first end wall and a second end wall. Each of the walls referenced above is substantially opaque. The first end wall and second end walls each have an animal ingress opening. The front wall has two channels, more specifically a channel associated with each ingress opening.

A first capture assembly is associated with the animal ingress opening of the first end wall and a second capture assembly associated with the animal ingress opening of the second end wall. Each of these animal capture assemblies includes a door and a ramp. The ramp is pivotal between a first position and a second position. When the ramp is in the first position, an animal can enter the ramp through the animal ingress opening. When the ramp is in the second position, the animal can exit the ramp into a storage section of the chamber. While the ramp is biased toward the first position of the ramp, the weight of an animal moving across the ramp will cause the ramp to move from its first position to its second position. To prevent the animal from escaping, a door is provided. The door pivots by movement of the ramp between a first position in which the door overlies a portion of the ramp permitting an animal to enter the ramp through the animal ingress opening, and a second position preventing an animal on the ramp from existing through the animal ingress opening. When the animal exits the end of the ramp opposite the ingress opening, the ramp and door return to their respective first positions such that the ramp blocks the path from the storage section to the ingress opening.

A first indicator is associated with the ingress opening of the first end wall. This indicator includes a channel in the front wall adjacent the first ingress opening. The channel has an opening defined by two lips and facing the interior of the chamber, a stop, and an open top. Positioned within the first channel is a shaft movable between a retracted and extended position. A neck is coupled at one end to and extends from the shaft between the two lips of the channel. An engagement member is coupled to the other end of the neck which cooperates with the lips and the stop to retain a portion of the shaft within the channel. The engagement member cooperates with the ramp of one of the capture assemblies so that, if the shaft is in its retracted position, as the ramp moves between the ramp's first position and the ramp's second position, the shaft moves from its retracted position to its extended position. A second indicator of the same construction is provided in association with the second ingress opening.

A cover closes the chamber while leaving the tops of the channels of the indicators uncovered. As such, the shafts of the first and second indicators are permitted to move between their retracted and extended positions. In some embodiments, the cover cooperates with catches on the shafts of the first and second indicators to retain the shaft of an indicator in its extended position when the ramp that moved the shaft returns to the ramp's first position. In these embodiments, the position of the shaft serves to indicate the presence of an animal in the trap. In another embodiment, the cover cooperates with a catch on a flag pole to hold the flag in an undeployed position. Upward movement of the shaft caused by movement of the ramp releases the catch so that the flag pole and flag attached to the flag pole move into a deployed position. In these embodiments, the position of the flag provides an indication of the presence of an animal in the trap.

BRIEF DESCRIPTION OF THE DRAWINGS

FIG. 1 is a front perspective view of one embodiment of the animal trap of the present invention.

FIG. 2 is a rear perspective view of the embodiment of FIG. 1.

FIG. 3 is a cross-sectional view from the top of the trap of FIG. 1 showing the construction of one of the capture assemblies.

FIG. 4 is a partial cross-sectional view from the side showing the construction of the capture assembly shown in FIG. 3 with the ramp and door of the capture assembly in their respective first positions.

FIG. 5 is a partial cross-sectional view of the side similar to FIG. 4 but with the ramp and door of the capture assembly in their respective second positions.

FIG. 6 is a cross-sectional view showing one of the indicators with the shaft of the indicator in its lowered position.

FIG. 7 is a cross-sectional view similar to FIG. 6, but with the shaft of the indicator moved to in its raised position by movement of the ramp to its second position.

FIG. 8 is a cross-sectional view similar to FIGS. 6 and 7, but with the shaft of the indicator being retained in its raised position by contract with the cover even though the ramp has returned to its first position.

FIG. 9 is a front perspective view of an alternative embodiment of the animal trap of the present invention.

FIG. 10 is a rear perspective view of the embodiment of FIG. 9.

FIG. 11 is a partial cross-sectional view showing the ramp in its first position, the shaft of the indicator in its lowered position and the flag in its unreleased position.

FIG. 12 is a partial cross-sectional view showing the ramp after it has moved to its second position causing the shaft to lift thereby releasing the indicator flag.

DETAILED DESCRIPTION

A first animal trap 1 made in accordance with the present invention is shown FIGS. 1-8. As shown in FIG. 1, the trap 1 is positioned on a flat surface 2, such as a floor, against a wall 4. The animal trap has an elongated base 10. The base 10 has a chamber 12 (see, e.g., FIG. 4) defined by a front wall 14, a rear wall 16, a bottom wall 18, a first end wall 20 and a second end wall 22. A top cover 24 is also provided to selectively enclose the top of chamber 12. Each of the walls defining the chamber 12 and the top cover 24 are made of a non-transparent material and, preferably, an opaque material to shield the contents of the chamber from the view of persons in the area of the trap. The rear wall 16 or bottom wall 18 may include a transparent window 17 (see FIG. 2) made of a clear material such as plastic through which the contents of the chamber may be selectively viewed. A removable window cover (not shown) could be employed to selectively prevent viewing through the window. Alternatively, the trap 1 can be placed against a surface such as wall 4 as shown in FIG. 1, so is not possible to see through the window 17.

As shown in FIG. 2, hinges 26 and 28 join one side of the cover 24 to the rear wall 16. Those skilled in the art will appreciate the top cover 24 could alternatively be hinged to the front wall 14 or one of the two end walls 20 or 22. In fact, hinging the top cover 24 to the base 10 is not really even necessary, but simply assists in keeping the top cover 24 and base 10 together and properly oriented with each other when covering or uncovering the top of chamber 12.

The traps shown in the drawings can be referred to as live or humane traps. This is because the trap 1 does not destroy the animals, but rather captures the animals so they can be transported to a more suitable location while still in the chamber of trap 1 and then set free by opening the cover 24. The trap 1 can also be described as a repeating trap since its capture assembly 30 resets itself after an animal has been captured to permit capture of additional animals. The capture assembly 30 that provides repetitive humane trapping of the animals will now be described.

As shown, end wall 20 has an animal ingress opening 21 and end wall 22 has an animal ingress opening 23. A separate capture assembly 30 is associated with each of the ingress openings 21 and 23. Between the two capture assemblies 30 is the storage section 13 of the chamber 12. Bait can be placed in the storage section 13 which also houses animals after capture. Each capture assembly 30 includes a door 32 and ramp 34. The door 32 includes a plate 36 and an axle 38. The width of the plate 36 is slightly less than the distance between the front wall 14 and the rear wall 16. The axle 38, located near the bottom of the plate 36, rotationally secures the door 32 to the front wall 14 and the rear wall 16 so the door 32 can pivot between a first position (see FIG. 4) which allows an animal to enter the trap 1 through the ingress opening and a second position (see FIG. 5) which prevents the animal from exiting the trap through the ingress opening. The ramp 34 includes a plate 40 and an axle 42. The plate 40 of the ramp 34 is slightly narrower than the distance between the front wall 14 and rear wall 16. The axle 42 rotationally secures the plate 40 of the ramp 34 to the front wall 14 and the rear wall 16 so the ramp can pivot between a first position (see FIG. 4) which allows an animal to enter the ramp 34 through the ingress opening and a second position (see FIG. 5) which allows the animal to exit the ramp 34 into the storage section 13 of chamber 12. The weight of plate 40 is distributed with respect to axle 42 to bias the ramp 34 toward its first position.

When the ramp 34 and door 32 are in their respective first positions as shown in FIG. 4, the plate 36 of the door 32 overlies the plate 40 of the ramp 34. As an animal moves across the ramp 34 and past both the plate 36 of the door 32 and the axle 42 of the ramp 34, the weight of the animal will move the ramp 34 from its first position to its second position shown in FIG. 5. This movement of the ramp 34 will cause the door 32 to move from its first position to its second position. When in its second position, the door 32 prevents an animal from reversing its direction of travel and exiting the trap 1 through the ingress opening. As soon as the animal moves off the ramp 34 and into the storage section 13 of chamber 12, the ramp 34 and the door 32 will automatically return to their respective first positions. After the ramp 34 returns to its first position, it blocks the path from the storage section 13 of chamber 12 to the ingress opening so an animal within the storage section 13 of chamber 12 cannot exit the trap 1 through the ingress opening.

As shown in FIGS. 4 and 5, a ridge 25 extends down a short distance from the cover 24. This ridge 25 prevents an animal within the storage section 13 of the chamber 12 from pulling the ramp 34 down and into its second position. Even if an animal were able to somehow do so, the motion of the ramp 34 would return the door 32 to its second, closed position preventing an animal from exiting the trap 1 through the ingress opening.

The trap 1 shown in the drawings offers a number of advantages. First, animals can enter the trap from either end. Second, the capture assembly 30 at each end resets itself each time an animal exits one of the ramps 34 into the storage section 13 of the chamber 12. Thus, the trap 1 can capture additional animals without being reset by a person. Third, the design of the trap 1 permits a variety of baits to be used. These are easily positioned within the storage section 13 of the chamber 12. Fourth, the trap 1 hides from view the animals, such as rats and mice, trapped within the storage section 13 of chamber 12. Many people consider such animals to be dirty, germ-carrying and repulsive. This has been true since the Middle Ages when people first associated such animals with the black plague. The trap 1 shown in the drawings has an additional feature which will now be described.

While it is important to conceal the contents of the storage chamber 13 from view, it is also beneficial to provide a clear indication of the presence of one or more animals within the trap 1. It is also beneficial to know the direction from which an animal came before entering the trap. Thus, the trap 1 shown includes a separate indicator 50 associated with each of the ingress openings 21 and 23. The indicators 50 will tell the user whether there is at least one animal in the trap that entered through a particular ingress opening 21 or 23 and thus whether animals entering the trap 1 likely approached from one side of the trap 1, the other side of the trap 1, or both sides of the trap 1.

As shown in the drawings, proximate each end wall 20 and 22 along front wall 14 is a channel 52. The channel 52 has an open top 54, a pair of opposing lips 56 and 58 defining a space open to the chamber 12, and a stop 62. Positioned within each channel 52 is a shaft 64 movable between a retracted position and an extended position in which the top of the shaft 64 is raised over the open top 54 of the channel 52. The indicator 50 also includes a neck 66 projecting from the shaft 64 between the lips 56 and 58 of the channel 52. Secured to the end of the neck 66 opposite the shaft 64 and outside the channel 52 is an engagement member 68. The engagement member 68 performs two functions. First, the bottom of the engagement member engages a portion of the ramp 34. As the ramp 34 moves between its first position and its second position, the shaft 64 moves from its retracted position to its extended position. In the embodiment shown in FIGS. 1-8, as the ramp 34 returns from its second position to its first position, the shaft 64 does not necessarily return to its retracted position because the ramp 34 is not affixed to the engagement member. Second, the top of the engagement member 68 will engage the stop 62 of the channel 52 preventing the shaft 64 from becoming detached from the channel 52.

As shown in the drawings, the cover 24 has a recess 70 aligned with the top of each channel 52 to permit the shaft 64 to slide within the channel 52 between its retracted and extended position as the ramp 34 moves from its first position to its second position. In the embodiment shown in FIGS. 1-8, to hold the shaft 64 in its extended position when the ramp 34 returns to its first position, a catch 72 is provided toward the top of the shaft 64. This catch 72 will engage the top of the cover 24 (see FIG. 8) to hold the shaft 64 in the extended position when the ramp 34 returns to its first position. As such, the shaft 64 in its extended position provides an indication that an animal is within the chamber 12 and entered through the ingress opening 21 or 23 closest to the particular indicator 50.

FIGS. 9-12 show a second embodiment having modified indicators 50. In this second embodiment, each indicator 50 includes a flag 90 coupled to a flag pole 92. One end of the flag pole 92 is coupled to either the base 10 or the cover 24. As shown in the drawings, this end of the flag pole 92 is inserted into opening 94 in the cover 24 to secure the flag pole 92 to the cover 24. The opposite end of the flag pole 92 has a catch 96. The flag pole 92 is either made of a memory material or spring material or includes a spring (not shown) that allows the flag pole 92 to be bent down over the top of the cover 24 so the catch 96 can engage the wall of the recess 70 of the cover 24 to hold the flag 90 in a first undeployed position. See FIG. 11. As shown on the left side of FIG. 9, the right side of FIG. 10 and in FIG. 12, movement of ramp 34 to its second position raises the shaft 64 of the indicator 50. The top of the shaft 64 engages and dislodges the catch 96 from the recess 70 allowing the flag to spring back to a deployed position indicating an animal entered the trap through the ingress opening associated with the indicator 50 having the flag 90 which was deployed. In the embodiment shown in FIGS. 9-12, the shaft 64 could be coupled to the ramp 34 and the catch 72 could be eliminated such that the shaft 64 returns to its lowered position when the ramp 34 returns to its first position because the flag 90 will have been released and will remain deployed.

As should be clear from the foregoing, the present invention provides an improved humane repeating trap. By providing a window 17 one can view the contents of the trap 1 without opening the cover 24. Opening the cover 24 could permit a trapped animal to escape. By covering the window 17 such as by placing the window against a wall as shown in FIG. 1 (or floor if the window is located in the bottom wall of the trap), the contents of the trap 1 can be hidden from view. By providing an indicator such as the indicator 50, one can tell whether an animal has entered the trap 1 without viewing the contents of the trap 1. By providing a separate indicator 50 for each ingress opening 21 and 23, one using the trap 1 can tell whether a particular ingress opening 21 or 23 was used by an animal to enter the trap.

Thus, the present trap provides advantages over prior traps that are not repeating traps. The present invention provides advantages over prior traps which do not shield the contents from view. The present invention provides advantages over prior traps which do shield the contents from view, but do not permit viewing of the contents without opening the trap. The present invention also provides advantages over prior art traps which shield the contents from view, but fail to provide any indication of the presence of an animal within the trap. The present invention also provides advantages over any multiple point of entry trap that provides an indication of the presence of an animal within the trap, but does not indicate the point(s) of entry used by animals to enter the trap.

The foregoing description is provided to meet the disclosure requirements of the patent laws, but is not intended to be limiting. The invention is defined and limited only by the following claims.

What is claimed is:

1. A self-resetting animal trap for capturing a plurality of animals alive comprising:
   (a) an elongate base comprising (i) at least four vertical walls including a front wall, a rear wall, a first end wall having an animal ingress opening, and a second end wall; (ii) a bottom wall; (iii) a chamber comprising an animal storage area having an open top; (iv) and an elongate vertical channel extending vertically along one of the vertical walls and proximate the first end wall, said elongate vertical channel having an open top and a pair of opposing elongate vertical lips defining an opening between the channel and the chamber;
   (b) a cover for closing the open top of the chamber, but not the open top of the elongate vertical channel;
   (c) a capture assembly proximate the animal ingress opening of the first end wall and the elongate vertical channel, the capture assembly including (i) a ramp which pivots between a first ramp position adapted to permit animals to enter onto the ramp through the animal ingress opening and a second ramp position adapted to permit animals to exit from the ramp into the animal storage area, the ramp being biased toward the first ramp position and adapted to move from the first ramp position to the second ramp position by the weight of an animal located on the ramp as the animal moves across the ramp away from the animal ingress opening toward the animal storage area, (ii) a pivoting door adapted to pivot, by movement of the ramp, between a first door position overlying the ramp when the ramp is in the first ramp position and a second door position blocking the animal ingress opening when the ramp is in the second ramp position, (iii) an indicator comprising a shaft having a bottom portion and a top portion and adapted to move vertically within the elongate vertical channel between a retracted position and an extended position in which the top portion of the shaft projects out of the elongate vertical channel through the open top of the elongate vertical channel, a neck coupled to and projecting horizontally at an angle from the bottom portion of the shaft through the opening between the vertically elongate lips of the channel into the chamber and terminating in an engagement member residing within the chamber on a different plane than the shaft, the shaft and the opening between the vertically elongate lips adapted to prevent the shaft from passing between the vertically elongate lips, and a catch, wherein as the ramp moves from its first position to its second position, the ramp engages the engagement member and through such engagement the ramp imparts a lifting force to the engagement member and thereby causes the neck to move upwardly within the opening between the vertically elongate lips and the shaft to move from the retracted position to the extended position signaling an animal capture, and wherein the ramp is adapted so that as the animal exits the ramp into the animal storage area the ramp returns from the second position to the first position, while the catch retains the shaft in its extended position and the engagement member disengages from the ramp so the indicator does not interfere with the ramp automatically returning to the first ramp position.

2. The self-resetting animal trap of claim 1 further including a second animal ingress opening and a second capture assembly proximate the second animal ingress opening.

3. The self-resetting animal trap of claim 2 further including a second elongate vertical channel extending vertically along one of the vertical walls proximate the second animal ingress opening, said second elongate vertical channel having an open top and a pair of opposing elongate vertical lips defining an opening between the second elongate vertical channel and the chamber.

4. The self-resetting animal trap of claim 3 wherein said second capture assembly comprises (i) a second ramp which pivots between a first ramp position adapted to permit animals to enter onto the second ramp through the second animal ingress opening and a second ramp position adapted to permit animals to exit from the second ramp into the animal storage area, the second ramp being biased toward the first ramp position and adapted to move from the first ramp position to the second ramp position by the weight of an animal located on the second ramp as the animal moves across the second ramp away from the second animal ingress opening toward the animal storage area, (ii) a second pivoting door adapted to pivot by movement of the second ramp between a first door position, overlying the second ramp when the second ramp is in the first ramp position, and a second door position blocking the second animal ingress opening when the ramp is in the second ramp position, (iii) a second indicator comprising a second shaft having a bottom portion and a top portion and adapted to move vertically within the second elongate vertical channel between a retracted position and an extended position in which the top portion of the second shaft projects out of the second elongate vertical channel through the open top of the second elongate vertical channel, a second neck coupled to and projecting horizontally at an angle from the bottom portion of the second shaft through the opening between the elongate lips of the second elongate vertical channel into the chamber and terminating in a second engagement member residing within the chamber on a different plane than the second shaft, the second shaft and the opening between the vertical elongate lips of the second channel adapted to prevent the second shaft from passing between the vertical elongate lips of the second channel, and a second catch, wherein as the second ramp moves from its first ramp position to its second ramp position, the second ramp engages the second engagement member and through such engagement imparts a lifting force to the second engagement member and thereby causes the second neck to move upwardly within the opening between the vertically elongate lips of the second channel and causes the second shaft of the second indicator to move from the retracted position to the extended position signaling an animal capture, and wherein the second ramp is adapted so that as an animal exits the second ramp into the animal storage area the second ramp returns from the second position to the first position, while the second catch of the second indicator retains the shaft of the second indicator in its extended position and the second engagement member of the second indicator disengages from the second ramp so the second indicator does not interfere with the ramp automatically returning to the first ramp position.

* * * * *